(12) United States Patent
Garelick et al.

(10) Patent No.: US 6,460,818 B1
(45) Date of Patent: Oct. 8, 2002

(54) ADJUSTABLE LOCKABLE TANDEM SLIDE FOR BOAT SEAT

(75) Inventors: Richard J. Garelick, Minneapolis, MN (US); Paul A. Pilosi, Minnetonka, MN (US); Robert A. Riemenschneider, Oakdale, MN (US); Charles J. Hauck, Inver Grove Heights, MN (US)

(73) Assignee: Garelick Mfg. Co., St Paul Park, MN (US)

( * ) Notice: Subject to any disclaimer, the term of this patent is extended or adjusted under 35 U.S.C. 154(b) by 0 days.

(21) Appl. No.: 09/842,393

(22) Filed: Apr. 26, 2001

(51) Int. Cl.[7] .................................... F16M 13/00
(52) U.S. Cl. ............... 248/420; 248/429; 248/298.1
(58) Field of Search ................. 248/420, 429, 248/418, 430, 424, 298.1

(56) References Cited

U.S. PATENT DOCUMENTS

| | | | | |
|---|---|---|---|---|
| 2,636,545 A | * | 4/1953 | Johnson | 248/353 |
| 3,286,971 A | * | 11/1966 | Watler et al. | 248/429 |
| 3,848,937 A | * | 11/1974 | Harder, Jr. | 248/393 |
| 3,870,269 A | * | 3/1975 | Werner et al. | 248/394 |
| 4,109,973 A | * | 8/1978 | Terada | 248/430 |
| 4,209,159 A | * | 6/1980 | Becker et al. | 248/430 |
| 4,508,385 A | * | 4/1985 | Bowman | 297/341 |
| 4,756,503 A | * | 7/1988 | Fujita | 248/430 |
| 5,076,529 A | * | 12/1991 | Dove et al. | 248/429 |
| 5,172,882 A | * | 12/1992 | Nini | 248/430 |
| 5,224,749 A | * | 7/1993 | Gauger et al. | 248/429 |
| 5,275,370 A | * | 1/1994 | Terai | 248/429 |
| 5,348,261 A | * | 9/1994 | Nini | 248/424 |
| 5,564,315 A | * | 10/1996 | Schuler et al. | 248/424 |
| 5,720,462 A | * | 2/1998 | Brodersen | 248/425 |
| 5,741,000 A | * | 4/1998 | Goodbred | 248/424 |
| 5,806,825 A | * | 9/1998 | Couasnon | 248/429 |
| 5,961,088 A | * | 10/1999 | Chabanne et al. | 248/429 |
| 6,010,194 A | * | 1/2000 | Cykon | 248/429 |
| 6,032,914 A | * | 3/2000 | Bastida | 248/188.5 |
| 6,079,688 A | * | 6/2000 | Levillain et al. | 248/429 |
| 6,089,521 A | * | 7/2000 | Tarusawa et al. | 248/430 |
| 6,155,626 A | * | 12/2000 | Chabanne et al. | 248/503.1 |
| 6,227,596 B1 | * | 5/2001 | Foucault et al. | 248/429 |
| 6,347,777 B1 | * | 2/2002 | Webber et al. | 248/188.5 |
| 6,378,928 B1 | * | 4/2002 | Downey | 248/429 |
| 6,386,499 B1 | * | 5/2002 | Okazaki et al. | 248/429 |

* cited by examiner

Primary Examiner—Anita King
Assistant Examiner—Naschica S. Morrison
(74) Attorney, Agent, or Firm—Jacobson & Johnson

(57) ABSTRACT

A boat seat is mounted on two sets of slidably engaged members for slidably adjusting the location of the boat seat front and back with a locking mechanism for holding the seat at its adjusted location comprising a locking pin for engaging detent holes controlled by a lever arm extending out the front of and below the boat seat.

18 Claims, 4 Drawing Sheets

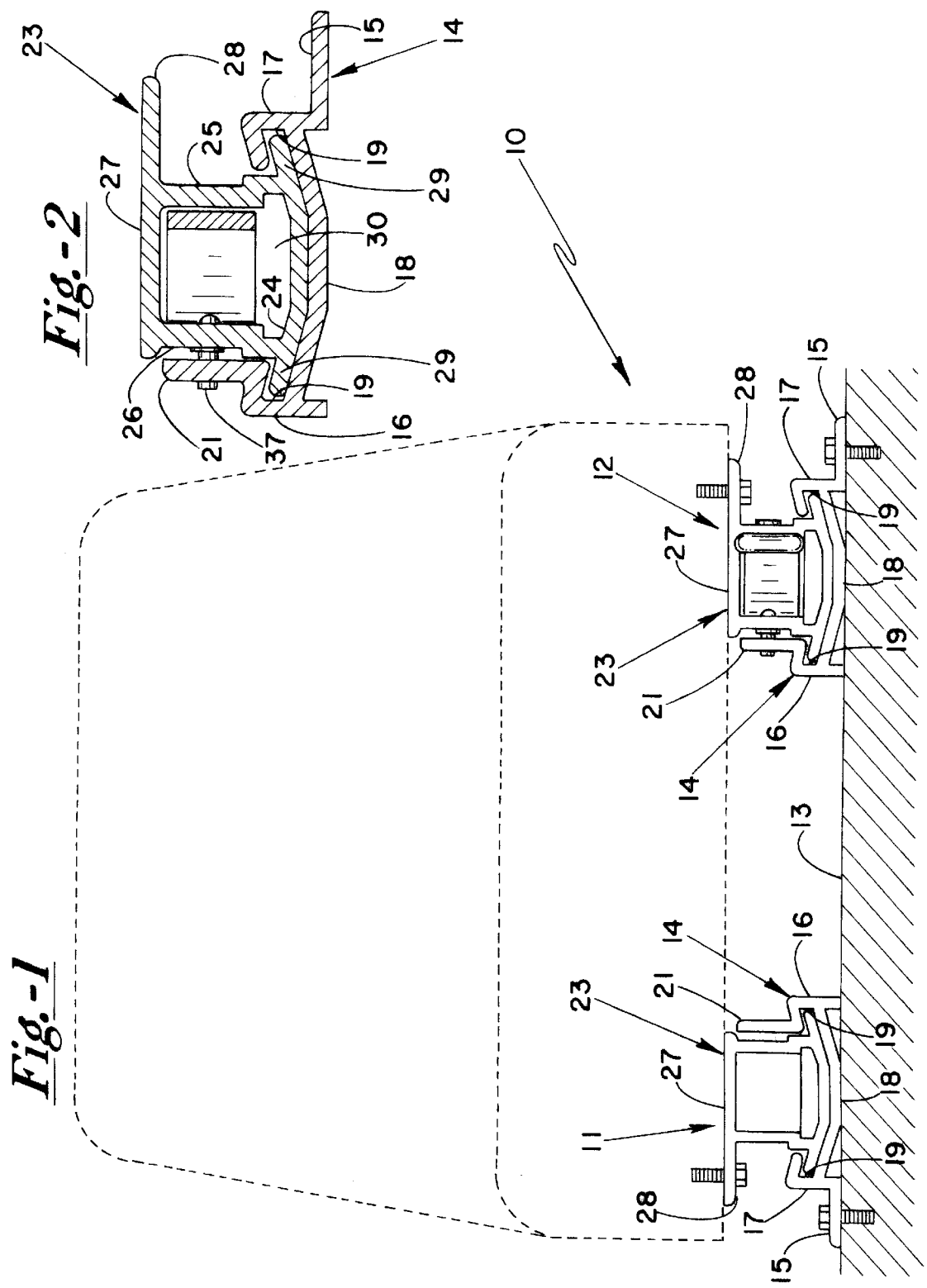

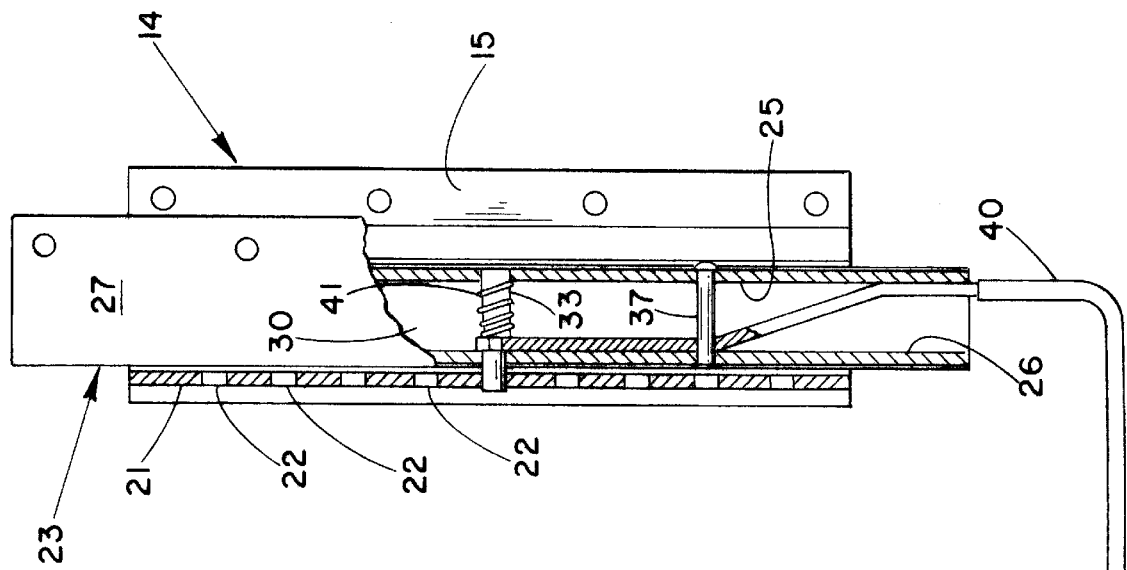
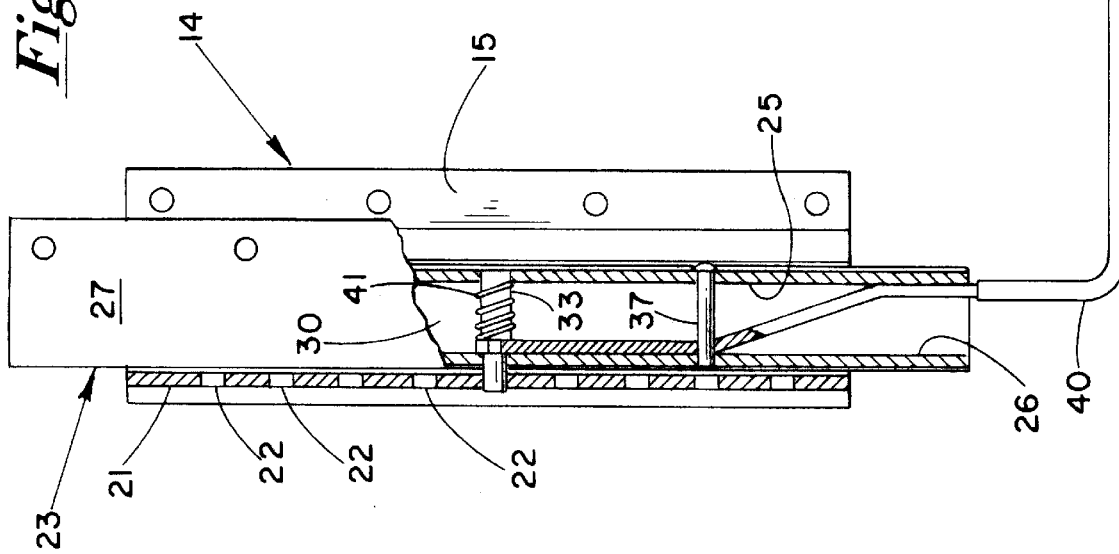
Fig.-5

ADJUSTABLE LOCKABLE TANDEM SLIDE FOR BOAT SEAT

FIELD OF THE INVENTION

This invention is to provide a slide adjustment and locking arrangement for a boat seat for slidably adjusting the seat fore and aft. It is primarily aimed for use with a low profile boat seat, i.e., where the boat seat rests virtually directly on the boat deck or on a raised portion of the boat deck but might find use with a pedestal mounted or raised boat seat.

DESCRIPTION OF THE PRIOR ART

The most pertinent prior art that applicant is presently aware of appears in U.S. Pat. No. 5,082,328 by Richard J. Garelick and U.S. Pat. No. 5,884,887 by Garelick and Pilosi and the references cited therein.

The '328 patent utilizes a pair of slidably engaged plate members for fore and aft adjustment with the boat seat attached to an upper plate member and a lower plate member anchored in some fashion to the boat deck For locking, a handle at the end of a laterally or sidewise extending threaded rod, which is threadably engaged in the side of one of the plate members, is turned to thread the rod into the plate member to force the opposite edges of the engaged plate members into snug frictional engagement to hold the two plate members together to prevent them from sliding with respect to one another. While successful, this device was somewhat awkward to use and did not have a solid anti-slide locking arrangement. The '328 patent also has a spring-biased lever arm for operating a locking pin for locking the seat against rotation or swiveling after it has been adjusted to the desired facing or direction.

The '887 patent also has similar slidably engaged members for adjusting the seat fore and aft. An edge of one of the members has a series of recesses for receiving teeth on a rod mounted in a track of one of the slidably engaged members. A spring biases the rod rotatably so that the teeth engage the recesses to lock the members together. An arm or handle extending outward and below the slide assembly is pushed (or pulled) to move or rotate the rod against the spring bias to disengage the teeth from the recesses to unlock the slide so that the seat can be slidably adjusted fore and aft. The slide assembly in both the '328 and the '887 patents are made for a specific style and dimensioned boat seat (usually raised or pedestal mounted boat seats) and are not adaptable for use with boat seats of various sizes or dimensions, particularly boat seats of different widths which are usually deck-mounted seats on speed boats or bass fishing boats or the like. Also, similar to the '328 patent, in the '887 patent manipulating the handle for unlocking the sliding members is somewhat cumbersome and is not convenient to use with a low profile or deck mounted seat.

SUMMARY OF THE INVENTION

As the word "tandem" in the title implies, this lockable slide for boat seat has two separate sets of slidably engaged members which are spaced laterally from one another under the boat seat. The upper member of each set is attached to the underside of the boat seat and is slidingly engaged with the lower member which is attached to the underlying support, usually the boat deck. The lower member of each set has inwardly extending slots defining a horizontal track and the other member of each set has outwardly extending edges or lips for slidably engaging the tracks of the lower member to permit the boat seat to be slidably adjusted fore and aft as desired. In at least one of the sets the lower member has an upstanding side wall with detent holes and the other member has a pin or rod slidably engaged in openings in opposite side walls of the member for engaging the detent holes to lock the two members against further sliding adjustment. A resilient member urges the pin into engagement with the detent openings. A lever arm which is engaged with the locking pin has a handle extending out the front end of the upper member by which the lever arm is movable in opposition to the urging of the resilient member to slidably disengage the pin from the detent opening to permit the seat to be slidably adjusted fore and aft.

The members of each set are metal extrusions, preferably aluminum, which can be made of any length as desired to accommodate boat seats of different depth, i.e., front to back dimension. Also, the sets can be mounted at any spacing necessary to accommodate the width dimension of a boat seat. Further, if needed, the locking feature can be incorporated into both sets of slidable members and the handles of the lever arms can be attached together so that they will operate in unison. A feature of this design is that it only takes a relatively short throw or motion of the handle of the lever arm to disengage the locking mechanism to permit the seat to be slidably adjusted. Also, the lever arm handle in front is at a somewhat more convenient location than a handle or knob extending outward from a side of the seat.

BRIEF DESCRIPTION OF THE DRAWINGS

FIG. 1 is an end view of an embodiment of the invention;

FIG. 2 is a vertical section of one set of slidably engaged lockable members;

FIG. 5 is a top partial breakaway view illustration of an alternate embodiment.

DESCRIPTION OF THE PREFERRED EMBODIMENTS

Figure 3:
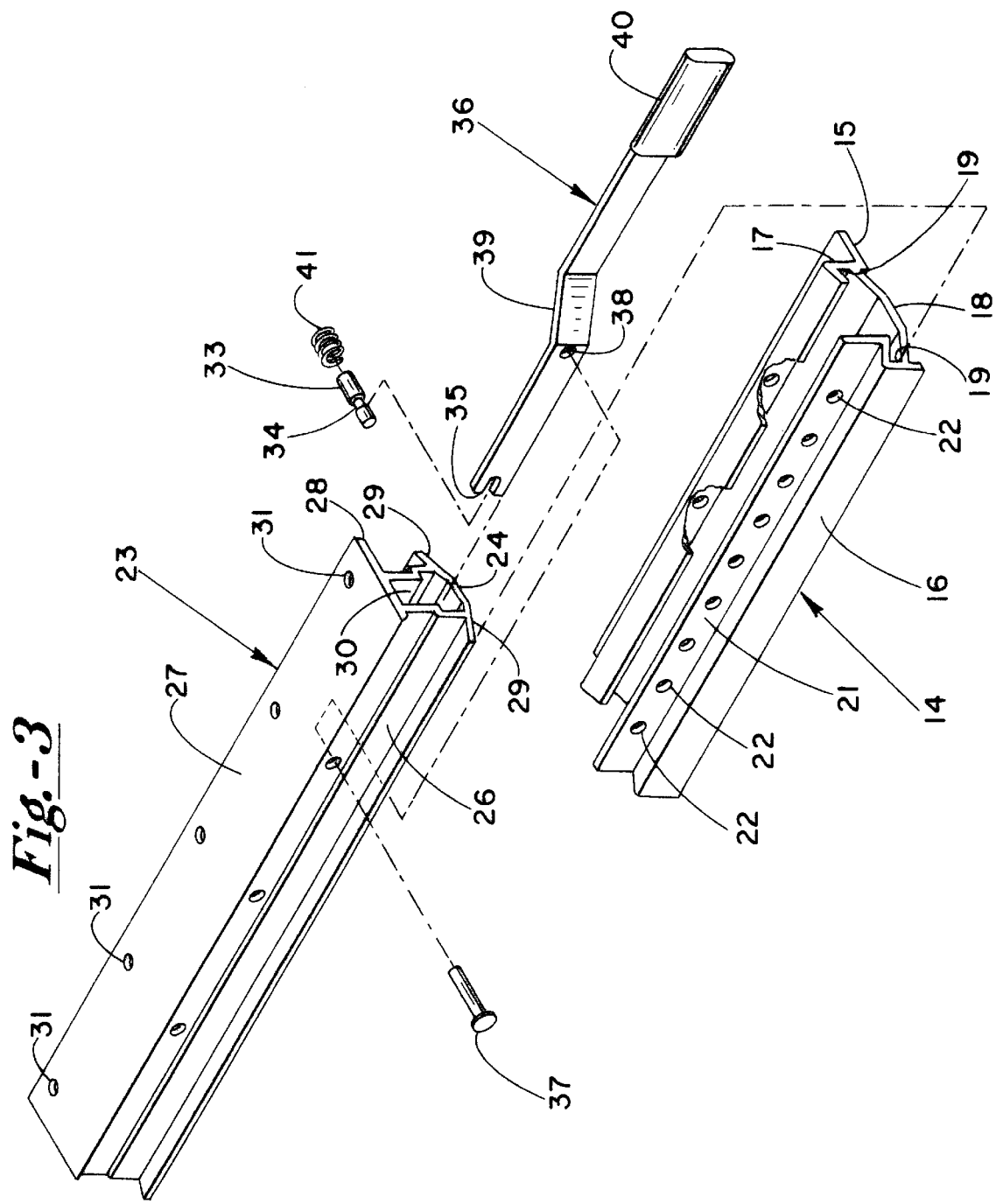
FIG. 3 is a blown-apart perspective view.
Figure 4:
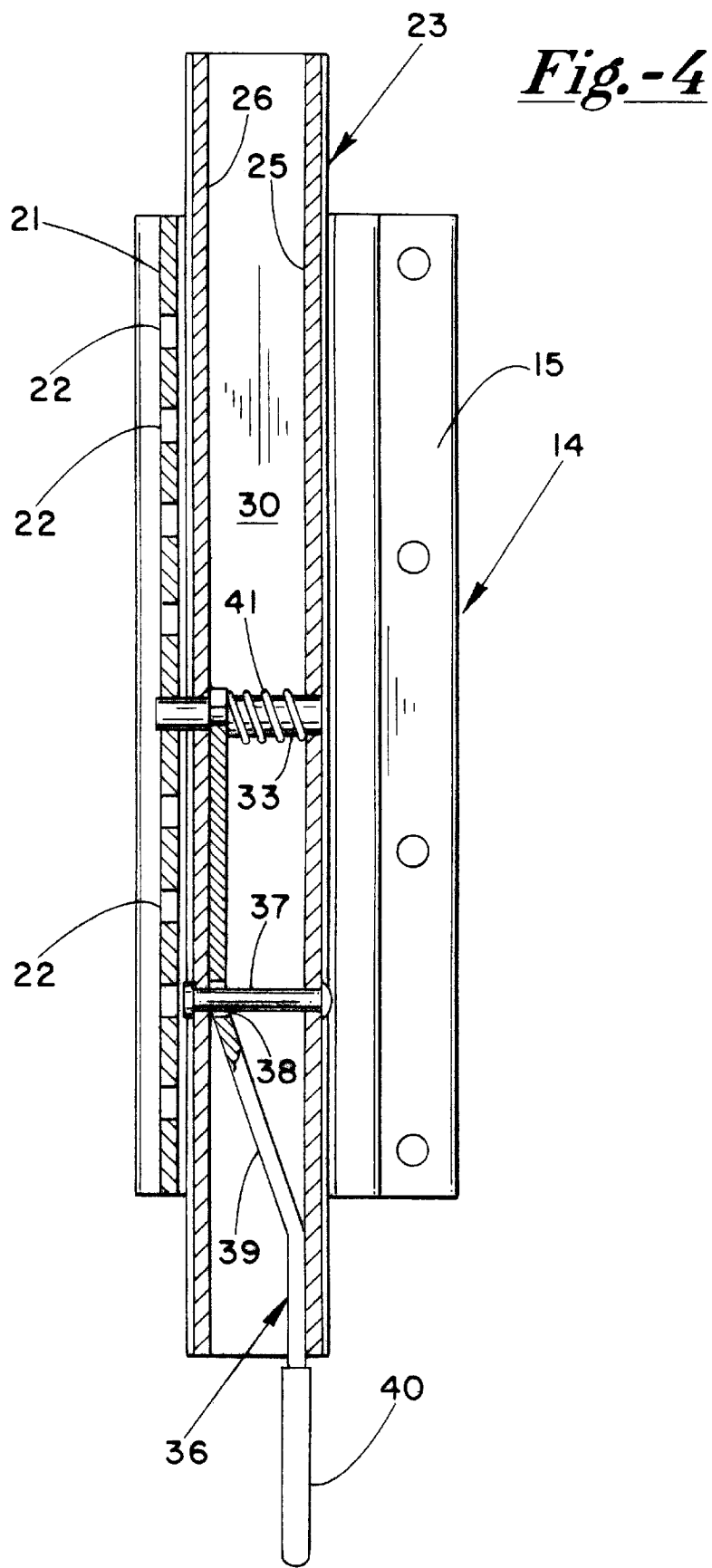
FIG. 4 is a top view with its upper plate removed showing the interior of the lockable member.

A boat seat 10 shown in shadow or phantom line is mounted on a pair of laterally spaced left and right or port and starboard sets of slidably engaged members identified respectively by reference numerals 11 and 12 which are mounted to the boat deck or flooring 13 and the underside of boat seat 10. Both sets 11 and 12 have a lower member 14 and a slidably engaged upper member 23. Lower member 14 has an extending flange 15 for securing the member to the boat deck in some conventional fashion usually by suitable bolts in suitably located openings in flange 15. Member 14 has a pair of upstanding laterally spaced side walls 16 and 17 and a beveled bottom wall 18 extending between the two side walls 16 and 17 and a pair of elongated inwardly opposite-facing elongated slots 19 forming tracks in side walls 16 and 17. Extending upward from side wall 16 is a rigid strip or sidewall extension 21. Strip 21 in set 12 has a series of longitudinally spaced detent holes 22 (see FIG. 3).

Both upper members 23 have an elongated chamber 30 formed by a bottom, a pair of side walls 25 and 26 and a top plate member 27. Preferably members 23 have a beveled bottom wall between the bottom edges of side walls 25 and 26. A flange 28 extends outward from top plate 27 and has a series of holes 31 for bolts to attach member 23 to the underside of boat seat 10. Both members 23 and 14 are extrusions or are cast out of a rigid metal preferably aluminum to conserve weight. Extending outward from the lower part of side walls 25 and 26 are lips 29 forming rails which slidably engage the slots or tracks 19 of member 14. The beveling of the bottom walls 24 and 18 allows a snug but slidable fit of the rails 29 in their respective slots or tracks 19 while minimizing the possibility of jamming or galling of the two slidably engaged members.

Heretofore the description of the embodiment illustrated in FIG. 1 was relative to the commonality between the two sets 11 and 12 of the slidably engaged upper and lower members 23 and 14. However, with regard to set 12 (the right hand set as viewed in FIG. 1) as mentioned earlier, the upper extending strip 21 of lower member 14 in set 12 has a series of longitudinally spaced detent holes or openings 22. A locking pin 33 is slidably engaged in opposite facing holes in the side members 25 and 26 of upper member 23 in set 12. Locking pin 33 has an undercut or annular outer groove 34 for engaging a slot 35 at one end of an elongated lever arm 36. Lever arm 36 is pivotally attached to upper member 23 by a pivot pin 37 which somewhat loosely engages an opening 38 in lever arm 36. Lever arm 36 is angled at 39 and extends out the front of chamber 30 to terminate in a handle end 40. A spring 41 is coiled around locking pin 33 between lever arm 36 and side wall 25 and is in compression or biased to urge the end of lever arm 36 in a direction to move locking pin 33 to seek engagement with one of the detent holes 22 in the slidably engaged lower member 14. The handle end 40 of lever arm 36 can be moved laterally to cause its distal end to move against the urging of spring 41 to draw the locking pin out of engagement with the detent hole 22 so that the boat seat can be slidably adjusted fore and aft. When the seat is in the desired location handle 40 can be released. The seat might have to be slid slightly forward or rearward until the locking pin 33 comes face-to-face with a detent hole 22 and then slides into the detent hole to lock the seat in the adjusted position.

Turning to the alternate embodiment illustrated in FIG. 5, the corresponding parts of the embodiment described heretofore are similarly marked with the same reference numeral in FIG. 5. As can be readily observed, the only difference between the two described embodiments is that the FIG. 5 embodiment comprises two identical sets of slidably engaged upper and lower member 23 and 14 with both sets incorporating a lever arm 36 for controlling the operation of a locking pin 33 which is biased by spring 41 toward detent holes 22 into the locking position. Both lever arms have a frontward extending handle 40 and the two lever arms are joined together at the handle end by an extension identified by reference numeral 42 so that the control of the locking pin in each set is done in unison. This arrangement may be necessary for a fairly wide boat seat to ensure that it is positively locked at both sides to avoid or minimize any shakiness.

We claim:

1. An adjustable lockable tandem slide for a boat seat, comprising:
   a) a pair of elongated parallel laterally spaced first rigid members adapted for resting securely on a support surface;
   b) said first rigid members each having a pair of elongated parallel vertical side walls with inward facing slots along said side walls defining a horizontal track and having a bottom wall between said side walls;
   c) an elongated rigid strip extending upward from one of said side walls of one of said first members, said strip having a series of spaced apart detent openings;
   d) a pair of elongated parallel laterally spaced second rigid members, each of said second members having a pair of elongated parallel vertical side walls, a horizontal plate attached to the upper edges of the side walls for attachment to the underside of a boat seat, and lips extending horizontally outward from the bottom edges of said side walls, the lips of each of said second members slidably engaging the respective tracks in said first members, one of said side walls of one of said second members facing said elongated strip of said first member;
   e) a locking pin slidably resting in opposite facing holes in the side walls of said one of said second members; and
   f) a lever arm located between the side walls of said one of said second members, said lever arm having a handle end extending outward from one end of said one of said second members, said lever arm coupled to said locking pin to selectively move said locking pin out of engagement with the detent openings in said elongated strip when said handle end is moved laterally.

2. An adjustable lockable tandem slide for a boat seat as described in claim 1 wherein:
   a) said lever arm is pivotally attached to one of said side walls of said one of said second members.

3. An adjustable lockable tandem slide for a boat seat as described in claim 2 further including:
   a) a resilient member urging said locking pin into engagement with said detent openings, said handle end of said lever arm being movable laterally to move the locking pin against the urging of said resilient member out of engagement with said detent openings.

4. An adjustable lockable tandem slide for a boat seat as described in claim 3 wherein said lever arm has a slot at its opposite end in engagement with an annular outer groove on said locking pin for laterally moving said locking pin when said handle end is moved laterally.

5. An adjustable lockable tandem slide for a boat seat as described in claim 4 further including:
   a) bottom beveled walls extending between the bottom edges of the side walls of each of said first and second members, the bottom wall of said first members in close proximity to the bottom walls of the slidably engaged second members.

6. An adjustable lockable tandem slide for a boat seat as described in claim 4 wherein said resilient member is in operative engagement with said lever arm.

7. An adjustable lockable tandem slide for a boat seat as described in claim 6 wherein said resilient member is a spring which is in compression.

8. An adjustable lockable tandem slide for a boat seat comprising:
   a) a pair of laterally spaced elongated parallel first rigid members adaptable for attachment to a supporting surface;
   b) each of said first members having a pair of laterally spaced parallel elongated tracks;
   c) one of said first members having a side wall extending vertically upward from its track, said side wall containing longitudinally spaced detent holes;
   d) a pair of laterally spaced elongated second rigid members adaptable for attachment to the underside of a boat seat;
   e) each of said second members having laterally spaced vertical side walls and outward extensions from said side walls defining rails slidably engaging the tracks of said first members;

f) a locking pin for engaging the detent holes in the side wall of said one first member, said pin slidably resting in opposite facing holes in both side walls of one of said second members; and g) a lever arm located between the side walls of said one second member and pivotally attached to a side wall of said one second member, said lever arm having a handle end extending longitudinally outward at one end of said one second member, said lever arm coupled to said locking pin to move said locking pin out of engagement with the detent holes of said one first member.

9. An adjustable lockable tandem slide for a boat seat as described in claim 8 further including:

a) a resilient member urging said locking pin into engagement with said detent holes, the handle end of said lever arm being movable laterally to move said locking pin opposite the urging of said resilient member out of engagement with said detent holes.

10. An adjustable lockable tandem slide for a boat seat as described in claim 9 wherein said lever arm has a slot at its end opposite said handle end and said locking pin has an annular outer groove, said slot engaging said groove for laterally moving said locking pin when the handle end of said lever arm is moved laterally.

11. An adjustable lockable tandem slide for a boat seat as described in claim 10 wherein said resilient member is in operative engagement with said lever arm.

12. An adjustable lockable tandem slide for a boat seat, comprising:

a) at least a pair of laterally spaced sets of slidably engaged rigid members, each set having an upper member adaptable for attachment to the underside of a boat seat and a lower member adaptable for attachment to a supporting surface;

b) the lower member of each set having elongated parallel side walls with inward opposite facing slots defining tracks and an elongated strip extending upward from one of said side walls, said strip having longitudinally spaced detent openings;

c) the upper member of each set having elongated parallel side walls with lips extending outward from said side walls, said lips slidably engaging the tracks of the respective lower member;

d) each of said upper members having a horizontal locking pin slidably resting in opposite facing holes in the side walls located to engage the detent openings in the slidably engaged lower member;

e) lever arms located between the side walls of each of said upper members, the lever arms having a handle end extending out one end of the upper members, said lever arms coupled to respective locking pins to selectively move said locking pins out of engagement with their respective detent openings when the handle end is moved laterally, said lever arms connected together to move laterally in unison.

13. An adjustable lockable tandem slide for a boat seat as described in claim 12 further including:

a) bottom beveled walls extending between the bottom edges of the side walls of each of said lower and upper members in said sets, the bottom wall of each upper member in close proximity to the bottom wall of its slidably engaged lower member.

14. An adjustable lockable tandem slide for a boat seat as described in claim 12 wherein:

a) said lever arms are pivotally attached to a side wall of their respective upper members.

15. An adjustable lockable tandem slide for a boat seat as described in claim 12 further including:

a) a resilient member urging each of said locking pins into engagement with the detent openings, the handle ends of said lever arms being movable laterally to move the locking pins against the urging of said resilient members out of engagement with the detent openings.

16. An adjustable lockable tandem slide for a boat seat as described in claim 15 wherein each of said lever arms has a slot at its opposite end in engagement with an outer annular groove on respective locking pins for laterally moving the locking pins when the handle ends of said lever arms are moved laterally.

17. An adjustable lockable tandem slide for a boat seat as described in claim 15 wherein said resilient members are operatively engaged with their respective lever arms.

18. An adjustable lockable tandem slide for a boat seat as described in claim 15 wherein said resilient members are spring members which are in compression.

* * * * *